Patented Nov. 21, 1933

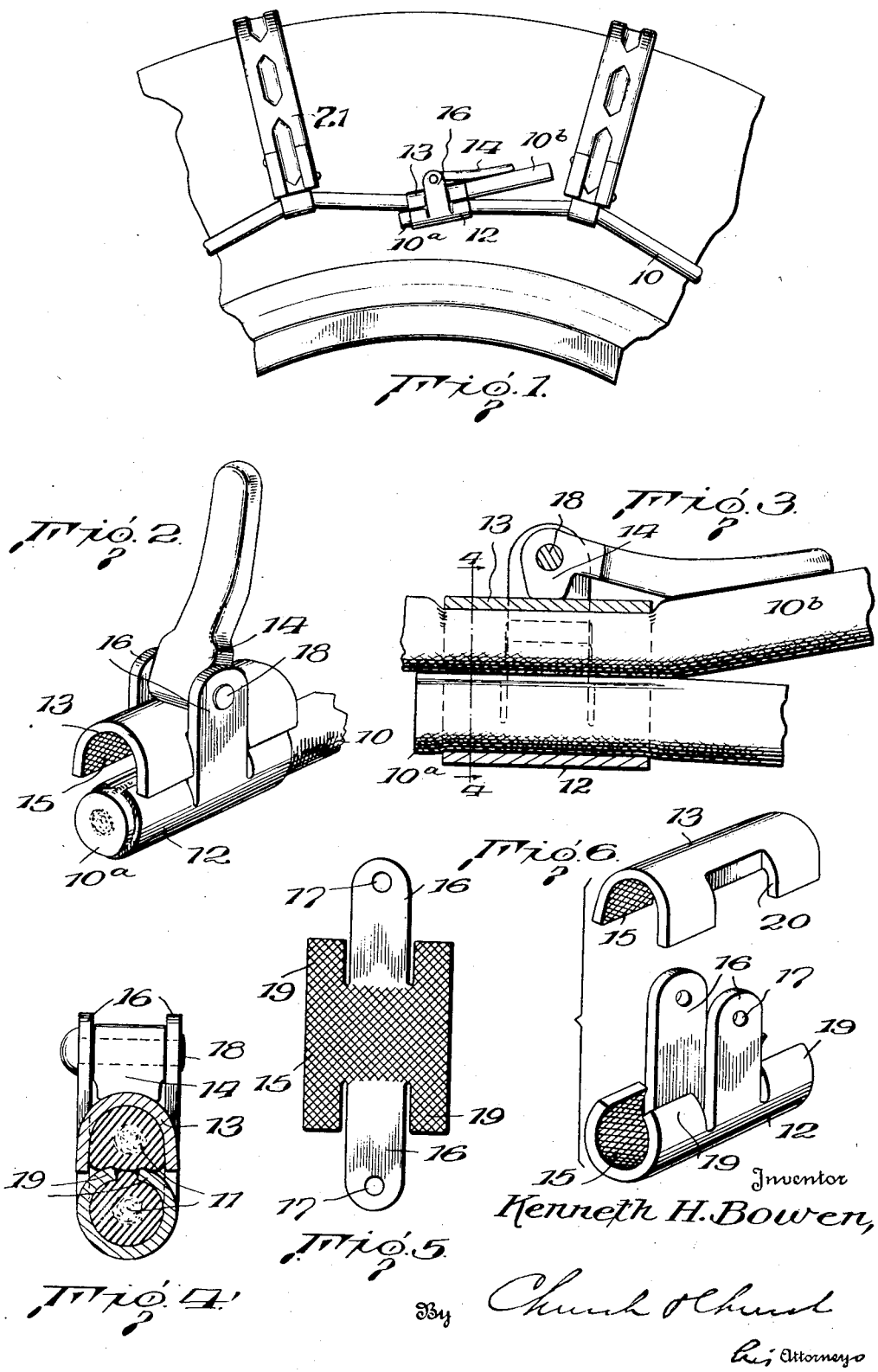

1,936,323

UNITED STATES PATENT OFFICE 1,936,323

CLAMP FOR ANTISKID DEVICES

Kenneth H. Bowen, Auburn, N. Y., assignor to Columbian Rope Company, Auburn, N. Y., a corporation of New York Application November 29, 1932
Serial No. 644,871

3 Claims. (Cl. 24—134)

This invention relates to improvements in devices for connecting the ends of side members of anti-skid devices for vehicles and particularly to a securing device for use in conjunction with anti-skid devices having side members formed of resilient compressible material.

One object is to provide a clamp combined with a resilient side member whereby the side member may be adjusted at will with respect to the circumference of the wheel to which the anti-skid device is applied. One end of the side member is permanently attached to the clamp and the other end thereof is adapted to be inserted and detachably secured in the clamp at any point along its length. With the side member formed of resilient, compressible material, the detachable end may be inserted until the side member is drawn as tightly around the wheel as desired and said end then secured in the clamp. Furthermore, due to the compressibility of the side member, there is no necessity of forming perforations or indentations therein for engagement by the connecting means or clamp. On the other hand, the clamp compresses the resilient side member and forms protuberances at the edges of the clamp which aid materially in securely retaining the side member in the clamp. Such an arrangement also eliminates the necessity of forming penetrating projections on the clamp member, all of which further lends to simplicity of construction and low production costs.

The invention also seeks to provide a clamp of simple but efficient construction. More specifically, said clamp comprises two clamping members or sections, one of which may be permanently attached to one end of the anti-skid device side member and the other section of which is loosely associated with the first section, there being a cam for forcing the loose section toward the permanently attached section. The cam retains the two sections together so that the entire clamp is formed of only four elementary, i. e., the two clamping sections, the cam and a pivot pin for the cam.

With these and other objects in view, the invention consists in certain novel details of construction and combinations and arrangements of parts, all as will hereinafter be more fully described and the novel features thereof particularly pointed out in the appended claims.

In the accompanying drawing,

Figure 1 is a side elevational view of a portion of a vehicle wheel illustrating a section of an anti-skid device secured thereon, the ends of the side member being attached to each other by a clamp made in accordance with the present invention;

Fig. 2 is a perspective view of the clamp and the end of the side member to which it is permanently attached;

Fig. 3 is a section taken longitudinally of the clamp with the two ends of the side member secured therein;

Fig. 4 is a sectional view on the line 4—4 of Fig. 3;

Fig. 5 illustrates the blank from which the permanently attached section of the clamp is formed;

Fig. 6 shows, in perspective, the two clamp sections disassembled.

In its broadest aspect, the present invention contemplates a combination of instrumentalities especially designed for anti-skid devices for vehicle wheels whereby the side members of such devices may readily be placed under any desired tension without the necessity of providing apertures or openings in the side members for use in conjunction with the fastening element or elements that are utilized for securing together the ends of said side members. More specifically, this combination consists of side members of resilient, compressible material and a fastening device composed of two clamp sections, one section being permanently attached to one end of a side member and the other section being adapted to have the other end of the side member inserted therein and releasably clamped thereby. The clamping action alone is relied upon to retain this inserted end of the side member and the latter can be inserted in the clamp any desired extent, the only limitation being the relation between the length of the side member and the diameter of the wheel. Therefore, the side member can be placed under any desired extension. As illustrated in Figs. 1 to 4, the side members 10 of the anti-skid devices are composed essentially of rubber although they preferably have cores 11 embedded therein to render them substantially inextensible. The cross members are indicated at 21. One end 10a of side member 10 is permanently attached to section 12 of the clamping device, and the other end 10b is inserted any desired distance between sections 12, 13 of the clamp. Section 13 is then forced toward section 12 by the action of a cam member 14. The inner surfaces of the clamp sections may be knurled as illustrated at 15. As will be readily understood, the resiliency of the side member 10 allows section 13 to be forced toward section 12 to such an extent that said section 13 occupies a position below the surface of the side member, as illustrated in Fig. 4, enlargements being formed, so to speak, at the ends of said clamp section whereby the end 10b will be securely held in the clamp. As stated, there is no necessity of providing openings or indentations in the side member for engagement by the fastening device and hence, any desired adjustment may be had in the application of the side members to the wheel.

The preferred construction of clamp consists in having section 12 provided with ears 16 perforated at 17 for the hinge pin 18 of the camming member 14. The end portions of section 12 are turned inwardly as at 19 to grip the end 10a of the side member. The section 13 is loosely received between ears 16, the sides of said member having recesses 20 therein through which the ears 16 extend. The ears therefore, hold section 13 against displacement laterally of the ears or longitudinally of the clamp, while the camming member 14 holds said section against accidental displacement longitudinally of the ears. In this way, the section 13 is simply loosely retained in its proper working association with section 12 and there is no liability of said section 13 sticking or jamming and interfering with the normal ease with which the entire anti-skid device is applied to a wheel.

What I claim is:

1. The combination with a resilient, compressible side member of an anti-skid device for vehicle wheels, said side member being imperforate and having a normally smooth surface, of a clamp for connecting the ends of said side member, said clamp being composed of one section attached to one end of the side member and a second section loosely associated with the first section whereby the other end of the side member may be inserted between the two clamp sections, and means for forcing the second section toward the first section and compressing said other end of the side member between the two sections to less than its normal cross-section, whereby protuberances are formed on the surface of said other end at the edges of said second clamp section.

2. A clamp for connecting the ends of a side member of anti-skid devices comprising a clamping member permanently attached to one end of the side member, a pair of ears formed on said clamp member, a second clamp member loosely positioned between said ears, there being recesses in the second member through which the ears extend, and a cam member for forcing the loosely positioned clamp member toward the permanently attached member.

3. A clamp for connecting the ends of a side member of an anti-skid device comprising a clamp member permanently attached to one end of the side member, ears formed on said clamp member, a second clamp member loosely positioned between said ears, projections on said second member engaging said ears to limit movement of the clamp member laterally of the ears, and a cam member pivoted in said ears for forcing the loose clamp member toward the permanently attached member.

KENNETH H. BOWEN.